United States Patent Office 3,403,094
Patented Sept. 24, 1968

3,403,094
CATALYST SUPPORT, HYDROCRACKING CATALYST, AND HYDROCRACKING PROCESS
Ralph J. Bertolacini, Chesterton, Ind., assignor to Standard Oil Company, Chicago, Ill., a corporation of Indiana
No Drawing. Filed July 13, 1966, Ser. No. 564,729
11 Claims. (Cl. 208—111)

ABSTRACT OF THE DISCLOSURE

The support for a hydrocarbon-conversion catalyst comprises fluorine and a promoting member selected from the group consisting of the alkali metals and the alkaline-earth metals on a silica-alumina cracking catalyst. The promoting member is present in an amount to provide a fluorine-to-promoting-member ratio between about 0.1 and about 5. The catalyst comprises a hydrogenating component and the support. The process for the hydrocracking of petroleum hydrocarbons employs the catalyst under suitable hydrocracking conditions.

---

This invention relates to the catalytic conversion of petroleum hydrocarbon feedstocks. More particularly, it relates to a support for a catalyst for the conversion of petroleum hydrocarbons, to a catalyst which employs this support and to a process for the catalytic conversion of petroleum hydrocarbons which uses such a catalyst having such a support. Still more particularly, this invention concerns a support for a hydrocracking catalyst, a catalyst using such a support, and a catalytic hydrocracking process employing such a catalyst having such a support.

Hydrocracking is a general term which is applied to petroleum refining processes wherein hydrocarbon feedstocks which have relatively high molecular weights are converted to lower-molecular-weight hydrocarbons at elevated temperature and pressure in the presence of a hydrocracking catalyst and a hydrogen-containing gas. Hydrogen is consumed in the conversion of organic nitrogen and sulfur to ammonia and hydrogen sulfide, respectively, in the splitting of high-molecular-weight compounds into lower-molecular-weight compounds, and in the saturation of olefins and other unsaturated compounds. In hydrocracking processes, hydrocarbon feedstocks, such as gas oils that boil in the range of about 350° F. to about 1000° F., typically, catalytic cycle oils boiling between about 350° F. and 850° F., are converted to lower-molecular-weight products, such as gasoline-boiling-range products and light distillates.

Generally, low-temperature hydrocracking processes for maximizing gasoline-boiling-range products employ two processing stages. In the first stage, the feedstock is hydrotreated to remove nitrogen and sulfur that are typically found in the usual refinery feedstocks. In the second stage, the pretreated hydrocarbon stream is converted to lower-boiling products. Consequently, the first stage is a feed preparation stage and the second stage is a hydrocracking stage.

There are also one-stage hydrocracking processes. In a one-stage process, denitrogenation and desulfurization occur in the first part of the catalyst bed or in the first reactor.

In the hydrocracking zone or stage of a hydrocracking process, the hydrocarbons are contacted with a suitable hydrocracking catalyst in the presence of hydrogen at elevated temperatures and pressures. Such catalysts may be selected from various well-known hydrocracking catalysts, which typically comprise a hydrogenation component and a solid acidic cracking component.

The hydrogenation component possesses hydrogenation-dehydrogenation activity and may exist in the metallic form or as a compound, such as the oxides and sulfides thereof. A large number of well-known metallic hydrogenation components or catalysts may be used in hydrocarbon conversion catalysts. Preferably, this metallic hydrogenation component is selected from the metals of Group VIII of the Periodic Table, for example, cobalt, nickel, and platinum, or from metals of Group VI-B, for example, molybdenum and tungsten, or oxides and sulfides thereof. These hydrogenation components can be introduced into a catalyst by impregnating the acidic cracking component with a heat-decomposable component of hydrogenation metal and then calcining the resulting composite.

The solid acidic cracking component of the hydrocracking catalyst may be made up of one or more of such solid acidic components as silica-alumina (naturally occurring and/or synthetic), silica-alumina-zirconia, silica-magnesia, fluorided-alumina, fluorided-silica-alumina, zeolitic aluminosilicate molecular sieves and zeolitic aluminosilicate molecular sieves suspended in either a matrix of alumina or in a matrix of silica-alumina. Each acidic component must possess substantial cracking activity in the finished catalyst composite. The preparation and the properties of such acidic cracking components are well known to those skilled in the art and need not be considered further. A discussion concerning some of these components may be found in Emmett's Catalysis, volume 7, Rheinhold Publishing Corporation, pages 1–91.

It has been found that the fluoride in a fluoride-containing support, such as fluorided-silica-alumina, is not optimally retained. It has been found further that the presence of an alkali metal or an alkaline-earth metal promotes the impregnation and retention of the fluoride in the support.

Briefly, in accordance with this invention, it has been discovered that a support comprising fluorine and a member selected from the group consisting of the alkali metals and the alkaline-earth metals on a silica-alumina cracking catalyst is an improved support for catalysts to be used in the catalytic conversion of petroleum hydrocarbons. The presence of the member selected from the group consisting of the alkali metals and the alkaline-earth metals effectively promotes fluoride retention on this support.

Those skilled in the art are well aware that an alkali metal, such as sodium, is deleterious to catalytic cracking when present in a catalytic cracking catalyst. It has been found unexpectedly that a hydrocarbon conversion catalyst, such as a hydrocracking catalyst, which has a support which comprises fluorine and a member selected from the group consisting of the alkali metals and the alkaline-earth metals on a silica-alumina cracking catalyst shows improved activity and improved fluoride retention.

Furthermore, in accordance with the present invention, there is provided a catalyst for the conversion of petroleum hydrocarbons, which catalyst comprises a hydrogenation component on a support which comprises fluorine and a member selected from the group consisting of the alkali metals and the alkaline-earth metals on a silica-alumina cracking catalyst. In addition, in accordance with the invention, there is provided a process for the conversion of petroleum hydrocarbons which comprises contacting the petroleum hydrocarbons under suitable hydrocarbon conversion conditions with a catalyst comprising a hydrogenation component and a solid acidic cracking component. The solid acidic cracking component is a support which comprises fluorine and a member selected from the group consisting of the alkali metals and the alkaline-earth metals on a silica-alumina cracking catalyst. The process may be either a one-stage hydrocracking process or a two-stage hydrocracking process, depending on the hydrogenation component used in the hydrocracking catalyst.

The present invention will be more fully understood by reference to the following description and examples.

In the operation of a hydrocarbon-conversion process, such as a hydrocracking process, a selected feedstock is used. Generally, in the case of a hydrocracking process because of the nitrogen and sulfur content of such a feedstock, the feedstock is first contacted with a hydrofining catalyst under hydrofining conditions to convert the nitrogen to ammonia and the sulfur in the feedstock to hydrogen sulfide. This feed-preparation treatment may be operated in the liquid phase, the vapor phase, or mixed vapor-liquid phase. The catalyst may be of a fixed-bed type, a fluidized-bed type, or some other appropriate type of catalyst system. Feedstocks, which may be used, may be derived from petroleum, shale, gilsonite, or other sources.

Those feedstocks which may be satisfactorily converted in a process using a catalyst containing the improved support of this invention may consist essentially of all saturates, or they may consist of practically all aromatics, or they may be mixtures of the two types of hydrocarbons. The saturates are hydrocracked to gasoline-boiling-range paraffins containing isoparaffins in the product in a concentration that is greater than that found for equilibrium. The polynuclear aromatics are partially hydrogenated and the hydrogenated ring portion is hydrocracked to produce an alkyl substituted benzene and an isoparaffin. Suitable feedstocks may contain the high-boiling fractions of crude oil, which may boil at a temperature as high as 1200° F. However, generally the feedstock will range from naphtha and kerosene to and through the heavy gas oils. Normally, the feedstocks will boil between about 350° F. and about 850° F. Therefore, the light catalytic cycle oil, which boils in the range between about 350° F. and about 650° F., the heavy catalytic cycle oil which boils in the range between about 500° F. and about 800° F., and a virgin gas oil which boils in the range between about 400° F. and about 1000° F. are suitable feedstocks.

Generally, amounts of sulfur which are found in such feedstocks do not affect adversely the catalyst employed in a hydrocarbon conversion process, such as a hydrocracking process. However, combined nitrogen and oxygen in such feedstocks affect deleteriously the catalyst in hydrocarbon conversion processes, such as hydrocracking processes. In view of this, the concentration of nitrogen and oxygen in the feedstock should be maintained as low as possible in order to minimize catalyst contamination and deactivation. Although the above-mentioned feedstocks may contain as much as 0.1 weight percent nitrogen, such nitrogen concentration is readily reduced in the feed-pretreatment stage to a value which is conducive to a more satisfactory catalyst life.

In the hydrocarbon conversion process of the present invention, the feed to be contacted must have a nitrogen content that does not exceed 10 parts per million nitrogen. If the feedstock to be converted contains a greater nitrogen concentration, the feedstock is first subjected to a feed-preparation treatment. Such a feed-preparation treatment will be carried out in the first stage of a two-stage process or will be performed in the first part of the catalyst bed in a one-stage process. The treatment in the two-stage process comprises contacting the feedstock in the presence of hydrogen at elevated temperatures and pressure with a hydrofining catalyst under hydrofining conditions. Suitable hydrofining catalysts include those which comprise the oxides and/or sulfides of the Group VI–B and/or Group VIII metals deposited on a suitable support. Examples of satisfactory supports are alumina, titania, and silica-alumina. A cobalt-molybdenum catalyst, supported on a silica-alumina support, would be a satisfactory catalyst for use in the feed-preparation treatment. Preferably, a nickel-tungsten-sulfide-on-silica-alumina catalyst is used.

Suitable operating conditions that may be used in the feed-preparation stage or zone of a two-stage process include a reactor temperature in the range between about 500° F. and about 800° F., a pressure in the range between about 200 and about 2500 p.s.i.g., a hydrogen-to-oil ratio in the range between about 500 standard cubic feet of hydrogen per barrel of hydrocarbon and about 10,000 standard cubic feet of hydrogen per barrel of hydrocarbon, and a liquid hourly space velocity in the range between about 0.2 and about 10. Preferably, the temperature may range from about 600° F. to 725° F.; the pressure, from about 1200 to 1800 p.s.i.g.; the hydrogen-to-oil ratio, from about 1000 to about 7500 standard cubic feet of hydrogen per barrel of hydrocarbon; and the liquid hourly space velocity, from about 0.5 to about 5.0 volumes of hydrocarbon per hour per volume of catalyst.

After the feed-preparation treatment, the feedstock, which has no more than the maximum permissible amount of nitrogen, i.e., 10 parts per million nitrogen, is converted under hydrocarbon-conversion conditions by contacting a catalyst comprising a hydrogenation component on an acidic cracking component.

The catalyst support of the present invention is a support for a catalyst for the conversion of petroleum hydrocarbons. This support comprises fluorine and a member selected from the group consisting of the alkali metals and the alkaline-earth metals on a silica-alumina cracking catalyst. The fluorine should be present in an amount within the range between about 0.5 and about 5 weight percent, based on the weight of the support. The member selected from the group consisting of the alkali metals and the alkaline-earth metals should be present in an amount which will provide a fluoride-to-member ratio between about 0.1 and about 5. The silica-alumina cracking catalyst may be either a high-alumina cracking catalyst or a low-alumina cracking catalyst.

The catalyst of the present invention is a catalyst which can be used to convert petroleum hydrocarbons. As pointed out above, this catalyst comprises a hydrogenation component on the support described in the last preceding paragraph. Typical hydrogenation components may be selected from a group consisting of the metals of Group VIII of the Periodic Table, for example, cobalt, nickel, and platinum, the metals of Group VI–B, for example, molybdenum and tungsten, the oxides, sulfides, and mixtures thereof. Such a hydrocarbon conversion catalyst may be used advantageously for the hydrocracking of petroleum hydrocarbons.

The process of the present invention is a process for the conversion of petroleum hydrocarbons. This process comprises contacting the petroleum hydrocarbons under hydrocarbon-conversion conditions with a catalyst comprising a hydrogenation component on a support comprising fluorine and a member selected from the group consisting of the alkali metals and the alkaline-earth metals on a silica-alumina cracking catalyst. Amounts of the various components of such a catalyst are discussed above.

A preferred embodiment of a catalyst of this invention may contain a normally solid element of Group 5A of the Periodic Table, particularly arsenic and antimony, as an activity-control-affording material. Such a material balances the activities of the various catalytic elements so that a low rate for hydrogenation relative to that for isomerization results. Such balanced activities in the catalyst provide more branched paraffins and a better product distribution. Only small amounts of the activity-control-affording elements are required in the catalyst. Therefore, in the case of arsenic or antimony, only about 0.1 to about 5 moles of arsenic or antimony, preferably about 0.1 to 1 mole and optimally about 0.25 to about 0.75 mole of these elements are used per mole of the hydrogenation component. Such activity-control-affording elements also facilitate regeneration.

The catalyst support of this invention may be prepared through the use of conventional catalyst-preparation methods known to those skilled in the art. For example, an aqueous solution of a salt of an alkaline-earth metal is blended with a silica-alumina hydrogel, an appropriate amount of hydrofluoric acid is blended into the resultant gel, to form a homogeneous mixture, the homogeneous mixture is dried overnight at a temperature of about 250° F., and then calcined for 4 hours at a temperature of about 1000° F. As an alternate method, the homogeneous mixture may be spray dried prior to calcination.

The catalyst of this invention may be prepared by impregnating into the support through the use of heat-decomposable compounds sufficient amounts of the hydrogenating component and the activity-control-affording element. The resultant material is dried overnight at a temperature of about 250° F. and calcined for 4 hours at a temperature of about 1000° F.

A typical example of a preferred embodiment of the catalyst of this invention might comprise about 8 weight percent nickel and 2.5 weight percent arsenic, based on the total weight of the catalyst, 3.5 weight percent fluorine and about 3.8 weight percent calcium, based on the weight of the support, on a high-alumina silica-alumina cracking catalyst. The support comprises the calcium and fluorine on the silica-alumina cracking catalyst.

The process of this invention may be a process for the hydrocracking of petroleum hydrocarbons. Suitable operating conditions for such a hydrocracking process include a temperature ranging from about 450° F. to about 750° F., a pressure ranging from about 200 to 3000 p.s.i.g., a liquid hourly space velocity ranging from about 0.2 to about 5 volumes of hydrocarbon per hour per volume of catalyst, and a hydrogen-to-oil ratio ranging from about 2,000 to about 20,000 standard cubic feet of hydrogen per barrel of hydrocarbon. Preferably, the temperature is maintained from 500° F. to 700° F.; the pressure, from about 1000 to about 1800 p.s.i.g.; the liquid hourly space velocity, from about 0.5 to about 2 volumes of hydrocarbon per hour per volume of catalyst; and the hydrogen-to-oil ratio from about 5,000 to about 12,000 standard cubic feet of hydrogen per barrel of hydrocarbons.

Although the catalyst of this invention is particularly suitable for the hydrocracking of petroleum hydrocarbons, it may be used also as a catalyst for the preparation or pretreatment of a hydrocarbon feetstock which contains nitrogen in an amount greater than 10 parts per million. Therefore, it is conceivable that a two-stage hydrocracking process could employ such a catalyst in both stages.

Example I

A catalyst comprising nickel, arsenic, fluorine and silica-alumina was prepared. 515 grams of a Nalco high-alumina, silica-alumina cracking catalyst (about 25 weight percent alumina) were impregnated with 600 milliliters of a composite solution. This composite solution was prepared by blending solutions 1, 2 and 3. Solution 1 was prepared by dissolving 174 grams of nickelous nitrate hexahydrate in 300 milliliters of concentrated ammonium hydroxide. Solution 2 was prepared by dissolving 39.2 grams of ammonium fluoride in 200 milliliters of water. Solution 3 was prepared by dissolving 17.6 grams of arsenic trioxide in 100 milliliters of 50 percent ammonium hydroxide solution. The three solutions were combined to form the composite solution, which was used in the impregnation of the silica-alumina cracking catalyst. Following impregnation, the catalyst was dried overnight at 250° F. The dried powder was then mixed with 2% Sterotex and pelleted to form 1/8″ x 1/8″ pellets. These pellets were calcined at 1000° F. for six hours and were ground subsequently to a 20–80 mesh powder. The nominal composition of the resulting catalyst was 8 weight percent nickel, 2.5 weight percent arsenic and 2 weight percent fluorine on silica-alumina.

This catalyst was used subsequently to hydrocrack pretreated heavy catalytic cycle oil (HCCO). This HCCO had been denitrogenated prior to its use as a hydrocracking feedstock. The denitrogenation was carried out over a Harshaw Chemical Co. catalyst, Harshaw catalyst No. 4301 E. This catalyst comprises nickel-tungsten sulfide on a fluorided silica-alumina. The denitrogenation, or feed pretreatment, was performed in two reactors, mounted in series, each reactor being a pipe having an inside diameter of 1.1 inches and a length of 20 feet. The denitrogenation conditions included: a temperature of 660° F., a pressure of 1500 p.s.i.g., a liquid hourly space velocity of about 1.0 volume of hydrocarbon per volume of catalyst, and a hydrogen rate composed of 21,000 standard cubic feet of recycle hydrogen per barrel of hydrocarbons and 1,650 standard cubic feet of once-through hydrogen per barrel of hydrocarbons.

The original HCCO contained 682 parts per million nitrogen and 2.28 weight percent sulfur and had a gravity of 19.6° API. The denitrogenated HCCO contained 0.5 part per million nitrogen and 0.1 weight percent sulfur.

Following the denitrogenation, the HCCO was subjected to a simple distillation and 87 volume percent were taken overhead. This overhead product, which contained 0.4 part per million nitrogen and 0.015 weight percent sulfur, was used as the hydrocracker feed.

The hydrocracking was carried out in a small-scale unit. The reactor was made from a 5/8-inch outside diameter stainless steel pipe and possessed a length of 14 inches. A 1/8-inch outside diameter axial thermowell extended up through the reactor. The catalyst bed length was approximately 1.46 inches. The reactor was heated in a Du Pont HI-TEC salt bath. Hydrocracking conditions included: a catalyst bed temperature of about 603° F., a pressure of about 1400 p.s.i.g., a hydrogen addition rate of about 10,000 standard cubic feet of hydrogen per barrel of hydrocarbon and a weight hourly space velocity of about 2.9. Prior to its use for hydrocracking, the catalyst was pretreated in hydrogen for one hour at a pressure of 1400 p.s.i.g and an average bed temperature of 750° F.

After three hours on oil, the catalyst was shown to have an activity expressed as a relative rate constant calculated at 600° F. of 2.05 and 73.8% of the hydrocracker feedstock was converted to $C_1$–385° F. material. After 21 hours on oil, the activity of the catalyst was shown to be 2.01 and 70.8% of the feedstock was converted to $C_1$–385° F. material.

Example II

A catalyst comprising nickel, arsenic, calcium, fluorine, silica and alumina was prepared. This catalyst used the improved support of the present invention. The improved support of this invention was prepared first. 35.4 grams of calcium nitrate tetrahydrate were dissolved in one liter of water. This solution was added to 3000 grams of cyanamid filter cake silica-alumina hydrogel (10% solids). The resultant slurry was homogenized. Then 15 milliliters of a solution prepared by adding 48 hydrogen fluoride to 250 milliliters of water was added to the homogeneous slurry while mixing. The mixture was blended, dried at 250° F. overnight and calcined for four hours at 1000° F. The resultant calcium-fluorine-silica-alumina support was prepared as a 20–80 mesh material.

The catalyst was prepared by impregnating 87 grams of the above 20–80 mesh material with a solution which had been prepared by dissolving 33.8 grams of nickel actate, 3.3 grams of arsenic trioxide, and 5.8 grams of ammonium fluoride in an ammonia solution. The impregnated material was dried at 250° F. overnight and calcined for four hours at 1000° F. The nominal concentrations of the resultant catalyst were 8% nickel, about 2.5% arsenic and 3.58% fluorine on silica-alumina.

The pretreated HCCO used in Example I was hydrocracked over this catalyst. The operating test conditions included: an average catalyst bed temperature of about 609° to about 612° F., a pressure of 1400 p.s.i.g., a hydrogen addition rate of about 12,000 to 13,000 standard cubic feet of hydrogen per barrel of hydrocarbon, and a weight hourly space velocity of about 3.9. Prior to its use for hydrocracking, the catalyst was pretreated in hydrogen for one hour at a pressure of 1400 p.s.i.g. and an average bed temperature of 750° F.

After three hours on oil, the catalyst was shown to have an activity expressed as a relative rate constant calculated at 600° F. of 3.00 and 92.5% of the hydrocracker feedstock was converted to $C_1$–385° F. material. After 21 hours on oil, the activity of the catalyst was shown to be 2.88 and 81.5% of the feedstock was converted to $C_1$–385° F. material. A subsequent analysis of this catalyst revealed that after the 21 hours on oil the catalyst had a fluorine content of 3.40 weight percent.

A comparison of the results obtained from Example I with the results obtained from Example II shows that the catalyst of Example II, i.e., the catalyst containing the support of the present invention, is more active, and is more selective with regard to the formation of $C_1$–385° F. material than the catalyst prepared in Example I. Furthermore, the fluoride retention of the catalyst in Example II was very good.

Example III

A catalyst comprising cobalt, molybdenum, silica and alumina was prepared. 2,060 grams of NalcoHA–1 silica-alumina were impregnated with 227 grams of cobalt acetate and 483 grams of molybdic acid. The cobalt acetate was dissolved in one liter of hot water while the molybdic acid was dissolved in 500 milliliters of 30% hydrogen peroxide. The two solutions were mixed and diluted with water to 2,500 milliliters. The impregnated material was dried overnight at 250° F., pelleted with 4% Sterotex into 1/8" x 1/8" pellets and calcined for four hours at 1000° F. The resultant material contained nominally 3 weight percent cobalt oxide and 18 weight percent molybdenum trioxide.

The above catalyst was used to hydrocrack a hydrocarbon feedstock which was a blend of 75% light catalytic cycle oil (LCCO) and 25% HCCO. This feedstock had a gravity of 28.4° API and contained 300 parts per million nitrogen and 1.6 weight percent sulfur. A true-boiling-point distillation of this feedstock included an initial boiling point of 303° F., and 10% point of 498° F., a 50% point of 601° F., a 90% point of 717° F. and a 95% point of 758° F.

The hydrocracking was carried out in a small-scale unit which had a reactor fabricated from 1-inch schedule 160 stainless steel pipe, having an internal diameter of 0.83 inch. The reactor was heated electrically and the catalyst charge was composed of 50 cc. of the pellets. The operating conditions included: an average catalyst bed temperature of about 800° F., a pressure of about 1500 p.s.i.g., a hydrogen addition rate of about 9000 standard cubic feet of hydrogen per barrel of hydrocarbon, and a liquid hourly space velocity of 1. 20 percent light naphtha was obtained at a conversion level of 60%. The ratio of isohexane to normal hexane was found to be 2, which is about an equilibrium value.

Example IV

A catalyst comprising cobalt, molybdenum, calcium, fluorine, silica, and alumina was prepared. 2430 grams of cyanamid filter cake silica-alumina hydrogen (approximately 10% solids) were blended with a solution which was prepared by dissolving 36 grams of calcium nitrate in 400 milliliters of water. Then a solution prepared by dissolving 48% hydrogen fluoride in 250 milliliters of water was added to the slurry while mixing. Subsequent to adequate blending, a solution prepared by dissolving 30 grams of cobalt acetate in 500 milliliters of water was added to and blended into the mixture. A solution was prepared by dissolving 42.5 grams of molybdic acid in 100 milliliters of 30% hydrogen peroxide. This solution was then blended into the mixture. The resulting material was dried overnight at 250° F., pelleted into 1/8" x 1/8" pellets, and the pellets were calcined for four hours at 1000° F.

The resulting catalyst was then tested under hydrocracking conditions in the reactor described in Example III with the hydrocarbon feedstock of Example III. The test conditions included: an average catalyst bed temperature of about 750° F., a pressure of 1500 p.s.i.g., a hydrogen addition rate of about 9000 standard cubic feet of hydrogen per barrel of hydrocarbon, and a liquid hourly space velocity of 1. The ratio of isohexane to normal hexane was 6. About 35% light naphtha was produced at a conversion of about 75%.

A comparison of the data obtained in Example III with the data obtained in Example IV shows that the catalyst of Example IV, which had the support comprising calcium and fluorine on a silica-alumina cracking catalyst, produces more naphtha and provides a much higher conversion and a much larger iso-to-normal-hexane ratio at a lower temperature. The test data in Examples III and IV were obtained from comparable test periods.

The results of the preceding four examples conclusively show that a catalyst having a support of this invention provides improved hydrocracking and excellent fluorine retention of the catalyst. The above examples are presented for demonstration purposes only and are not intended to limit the scope of this invention.

What is claimed is:

1. A support for a catalyst for the conversion of petroleum hydrocarbons, which support comprises fluorine and a promoting member selected from the group consisting of the alkali metals and the alkaline-earth metals on a silica-alumina cracking catalysts, said fluorine being present in an amount within the range between about 0.5 and about 5 weight percent, based on the weight of said support, and said promoting member being present in an amount which will provide a fluorine-to-promoting-member ratio between about 0.1 and about 5 to promote the impregnation and retention of the fluorine in said support.

2. A support for a catalyst for the hydrocracking of petroleum hydrocarbons, which support comprises fluorine and a promoting member selected from the group consisting of the alkali metals and the alkaline-earth metals on a silica-alumina cracking catalyst, said fluorine being present in an amount within the range between about 0.5 and about 5 weight percent, based on the weight of said support, and said promoting member being present in an amount which will provide a fluorine-to-promoting-member ratio between about 0.1 and about 5 to promote the impregnation and retention of the fluorine in said support.

3. A catalyst for the hydrocracking of petroleum hydrocarbons, which catalyst comprises a hydrogenating component on the support of claim 2.

4. The catalyst of claim 3, wherein said hydrogenating component is nickel and wherein a small amount of arsenic is added as an activity-control-affording element, said nickel being present in an amount within the range between 0.5 and about 30 weight percent, said arsenic being present in an amount within the range between about 0.1 and about 5 moles of arsenic per mole of said nickel.

5. A process for the hydrocracking of petroleum hydrocarbons, which process comprises contacting said petroleum hydrocarbons under hydrocracking conditions with the catalyst of claim 4, said hydrocracking conditions comprising a temperature within the range between about 450° F. and about 750° F., a pressure between about 200 p.s.i.g. and about 3000 p.s.i.g, a liquid hourly space velocity between about 0.2 and about 5 volumes of hydrocarbon per hour per volume of catalyst, and a hydrogen-to-oil ratio between about 2,000 and about 20,000 standard cubic feet of hydrogen per barrel of hydrocarbons.

6. The catalyst of claim 3 wherein said hydrogenating component comprises a mixture of cobalt oxide and molybdenum trioxide, said cobalt oxide being present in an amount between about 1 and about 5 weight percent, said molybdenum trioxide being present in an amount between about 3 and about 18 weight percent, based on total catalyst weight.

7. A process for the hydrocracking of petroleum hydrocarbons, which process comprises contacting said petroleum hydrocarbons under hydrocracking conditions with the catalyst of claim 6, said hydrocracking conditions comprising a temperature within the range between about 450° F. and about 750° F., a pressure between about 200 p.s.i.g. and about 3000 p.s.i.g., a liquid hourly space velocity between about 0.2 and about 5 volumes of hydrocarbon per hour per volume of catalyst, and a hydrogen-to-oil ratio between about 2,000 and about 20,000 standard cubic feet of hydrogen per barrel of hydrocarbons.

8. The catalyst of claim 3 wherein said hydrogenating component comprises at least one of the members selected from the gruop consisting of metals of Group VI–B of the Periodic Table, metals of Group VIII of the Periodic Table, their oxides, their sulfides, and mixtures thereof.

9. In an improved fluorine-containing support for a hydrocarbon-conversion catalyst, the improvement which comprises the presence of a promoting member selected from the group consisting of the alkali metals and the alkaline-earth metals on said support, said promoting member being present in an amount which will provide a fluorine-to-promoting-member ratio between about 0.1 and about 5.

10. The process of claim 5 wherein said temperature is maintained between about 500° F. and about 700° F., said pressure is maintained between about 1000 p.s.i.g. and about 1800 p.s.i.g., said liquid hourly space velocity is maintained between about 0.5 and about 2 volumes of hydrocarbon per hour per volume of catalyst, and said hydrogen-to-oil ratio is maintained between about 5000 and about 12000 standard cubic feet of hydrogen per barrel of hydrocarbons.

11. The process of claim 7 wherein said temperature is maintained between about 500° F. and about 700° F., said pressure is maintained between about 1000 p.s.i.g. and about 1800 p.s.i.g., said liquid hourly space velocity is maintained between about 0.5 and about 2 volumes of hydrocarbon per hour per volume of catalyst, and said hydrogen-to-oil ratio is maintained between about 5,000 and about 12,000 standard cubic feet of hydrogen per barrel of hydrocarbons.

References Cited
UNITED STATES PATENTS

| | | | |
|---|---|---|---|
| 3,073,777 | 1/1963 | Ottinger | 208—59 |
| 3,248,316 | 4/1966 | Barger et al. | 208—111 |

DELBERT E. GANTZ, *Primary Examiner.*

ABRAHAM RIMENS, *Assistant Examiner.*